United States Patent [19]

Andresen et al.

[11] Patent Number: 4,870,326

[45] Date of Patent: Sep. 26, 1989

[54] METHOD AND APPARATUS FOR DRIVING NEON TUBE TO FORM LUMINOUS BUBBLES AND CONTROLLING THE MOVEMENT THEREOF

[76] Inventors: Jack Andresen; Mark Andresen, both of 2663 Fair Oaks Ave., Redwood, Calif. 94063

[21] Appl. No.: 117,726

[22] Filed: Nov. 6, 1987

Related U.S. Application Data

[62] Division of Ser. No. 924,946, Oct. 30, 1986, Pat. No. 4,745,342.

[51] Int. Cl.⁴ ............................................. H05B 41/14
[52] U.S. Cl. ................................. 315/200 R; 315/174; 315/226; 315/DIG. 7
[58] Field of Search .................... 315/174, 200 R, 226, 315/281, DIG. 7; 362/812

[56] References Cited

U.S. PATENT DOCUMENTS

| | | | |
|---|---|---|---|
| 1,939,903 | 12/1933 | Kayser | 315/206 |
| 2,030,404 | 2/1936 | Ryde et al. | 315/108 |
| 2,091,953 | 9/1937 | Becquemont | 315/209 R |
| 2,121,829 | 6/1938 | Seaman | 315/201 |
| 2,214,441 | 9/1940 | Seaman et al. | 315/164 |
| 2,354,696 | 8/1944 | Mettler | 315/187 |
| 2,423,814 | 7/1947 | Mettler | 315/257 |
| 2,437,009 | 3/1948 | Warner | 315/268 |
| 3,440,488 | 4/1969 | Skirvin | 315/209 R |
| 4,178,534 | 12/1979 | McNeil et al. | 315/39 |
| 4,370,600 | 1/1983 | Zansky | 315/244 |
| 4,373,146 | 2/1983 | Bonazoli et al. | 315/209 R |
| 4,410,930 | 10/1983 | Yachabach | 315/76 |
| 4,477,748 | 10/1984 | Grubbs | 315/306 |
| 4,538,093 | 8/1985 | Melai | 315/219 |
| 4,553,070 | 11/1985 | Sairanen et al. | 315/209 R |
| 4,588,927 | 5/1986 | Kanno et al. | 315/76 |
| 4,745,342 | 5/1988 | Andresen et al. | 315/200 R |

OTHER PUBLICATIONS

PCT/US86/00851 Published 11-6-86 (Herrick).

Primary Examiner—Robert L. Griffin
Assistant Examiner—Ted Salindong
Attorney, Agent, or Firm—Jim Zegeer

[57] ABSTRACT

A system for driving a neon tube to form luminous bubbles and controlling the motion thereof in which a modulatable high AC voltage source is connected to control a pair of electronic switches in the primary circuit of a high voltage transformer which is connected to electrodes of said neon tube in such a way as to produce the luminous bubbles, which can be stationary or moved at varying speeds and direction by control of width and/or frequency of control pulses applied to the electronic switches. A memory stores predetermined patterns of the direction and speed of said luminous bubbles and microprocessor means for controlling said modulatable AC voltage in accordance with said predetermined pattern by said memory means to cause said luminous bubbles to move in said predetermined patterns of direction and speed. The memory may include a plurality of predetermined patterns stored, and selector for selecting one of said patterns and driving the neon tube therewith. For a plurality of neon tubes arranged in an artful pattern, and a plurality of modulatable high AC voltage AC sources are connected to respective ones of the neon tubes and means for selecting one or more of the predetermined patterns for driving one or more of the neon tubes.

8 Claims, 2 Drawing Sheets

METHOD AND APPARATUS FOR DRIVING NEON TUBE TO FORM LUMINOUS BUBBLES AND CONTROLLING THE MOVEMENT THEREOF

This is a divisional of application Ser. No. 924,946, filed Oct. 30, 1986, now U.S. Pat. No. 4,745,342.

BACKGROUND AND BRIEF DESCRIPTION OF THE INVENTION

In Kayser U.S. Pat. Nos. 1,939,903 and Becquemont 2,091,953, neon tubes are driven in such a way that the luminous discharge has the appearance of brilliant luminous balls or bubbles separated by dark spaces and appearing to move in the interior of the tube from one electrode to the other. In Kayser, an oscillating current is applied to each end of the neon tube with one of the tube ends being grounded and the direction of travel of the luminous span issuing from the non-grounded end of the tube is varied by varying the characteristics of the oscillating current. In the Kayser patent, a high frequency current has the voltage level thereof varied in a slow and progressive manner according to the apparent movement and development of the bubbles and then the high frequency current is shut-off and a low frequency industrial current is applied in a slow and progressive manner so that the main voltage of the oscillating current is varied. In Becquemont, a high frequency alternating current is applied to the electrodes at a sufficient frequency to produce the luminous bubbles separated by dark regions and a portion of the alternating current is rectified and superimposed on the applied alternating current. In yet another prior art system, a frequency of between 1500 and 4000 Hz is produced and the symmetry of the current applied to the tube is adjusted either by adjusting the clipping one of the peaks of a driving sinusoidal wave or by producing a substantially square wave voltage and adjusting the duty cycle thereof. Such a system is disclosed in Kennan C. Herrick PCT/US86/00851, International Publication No. WO86/06572, incorporated herein by reference application entitled "Apparatus and Method for Forming Segmented Luminosity in Gas Discharge Tubes".

The Herrick PCT application discloses regulation of the symmetry of the resultant tube current, i.e., regulation of the net current flow between the electrodes. The resultant or net current flow through the tube is regulated so as to control the movement of these alternating light and dark regions lengthwise along the tube. Regulation of net current flow may be accomplished either by imposition of a DC current across the electrodes in addition to the AC signal, or by use of an AC signal having an asymmetric wave form. Asymmetry of the wave form may be measured by determining the DC voltage across a capacitor connected in series with the gas discharge tube, and this measurement may be applied in a feedback loop to control the degree of asymmetry and hence control the rate of movement of the illuminated regions lengthwise along the tube. In a further variant, the tube may be provided with a midpoint electrode to provide net current flows either from the end electrodes towards the midpoint or from the midpoint towards the end, with corresponding movement of the light and dark regions towards or away from the midpoint.

THE PRESENT INVENTION

According to the present invention, a portion of an applied commercial AC supply (60 Hz) is rectified, filtered and applied to a commercially available semiconductor chip element which has a controllable oscillator serving as a signal generator and which has both duty cycle and frequency control adjustments. The logical output signal is coupled via an impedance matching circuit to the input primary winding of a signal transformer. The signal transformer has a pair of secondary windings which are used to drive a pair of tandem connected FET switches which, in turn, are connected across a second DC supply which has a high direct current voltage derived from the input AC line voltage (110–120V AC 60 Hz).

A pair of tandem connected capacitors is connected across the DC supply and an intermediate point between the tandem connected FET switches is connected to one end of the primary winding of a high voltage output transformer and a second intermediate point between the two tandem connected capacitors is connected to the opposite end of the primary winding of the high voltage output transformer so that on alternate half-cycles of the input signal coupled to the signal transformer from the impedance matching transistor switches is used to alternately drive the gate electrodes of the FET switches.

A series of control sequences for the FET switches is stored in a memory, such as a ROM or PROM, magnetic disk or tape or an optical memory, or a combination thereof, and a microprocessor is programmed to selectively retrieve one or more control sequences so as to cause the neon tube to go through a predetermined program of movements. In this regard, a plurality of neon tubes can be controlled in any predetermined pattern or sequence of luminous bubble movements from the same or a similar memory. Thus, in one neon tube the luminous bubbles can be controlled to move first in one direction at one speed, then in an opposite direction at the same or a different speed and then be stationary (zero velocity) for a predetermined time while the luminous bubbles in one or a plurality of other tubes of widely differing shape and curvatures are simultaneously controlled to go through their respective patterns of movements.

A ground-fault sensing shut-off circuit is connected to one of the output terminals of the high-voltage output transformer and includes comparator circuitry which is capable of sensing when a person, for example, touches one of the output terminals of the high voltage output electrode. This condition is sensed and used to operate a thyristor switch which shunts or by-passes the primary winding of the signal transformer to thereby terminate the operation of the FET switches and thereby terminate the generation of high voltages in the secondary windings of high voltage output transformer.

As used herein, the term "neon tube" includes tubes filled with gases other than neon.

The above and other objects, advantages and features of the invention will become more apparent when taken in conjunction with the accompanying drawings wherein.

DETAILED DESCRIPTION OF THE INVENTION

Figure 1:
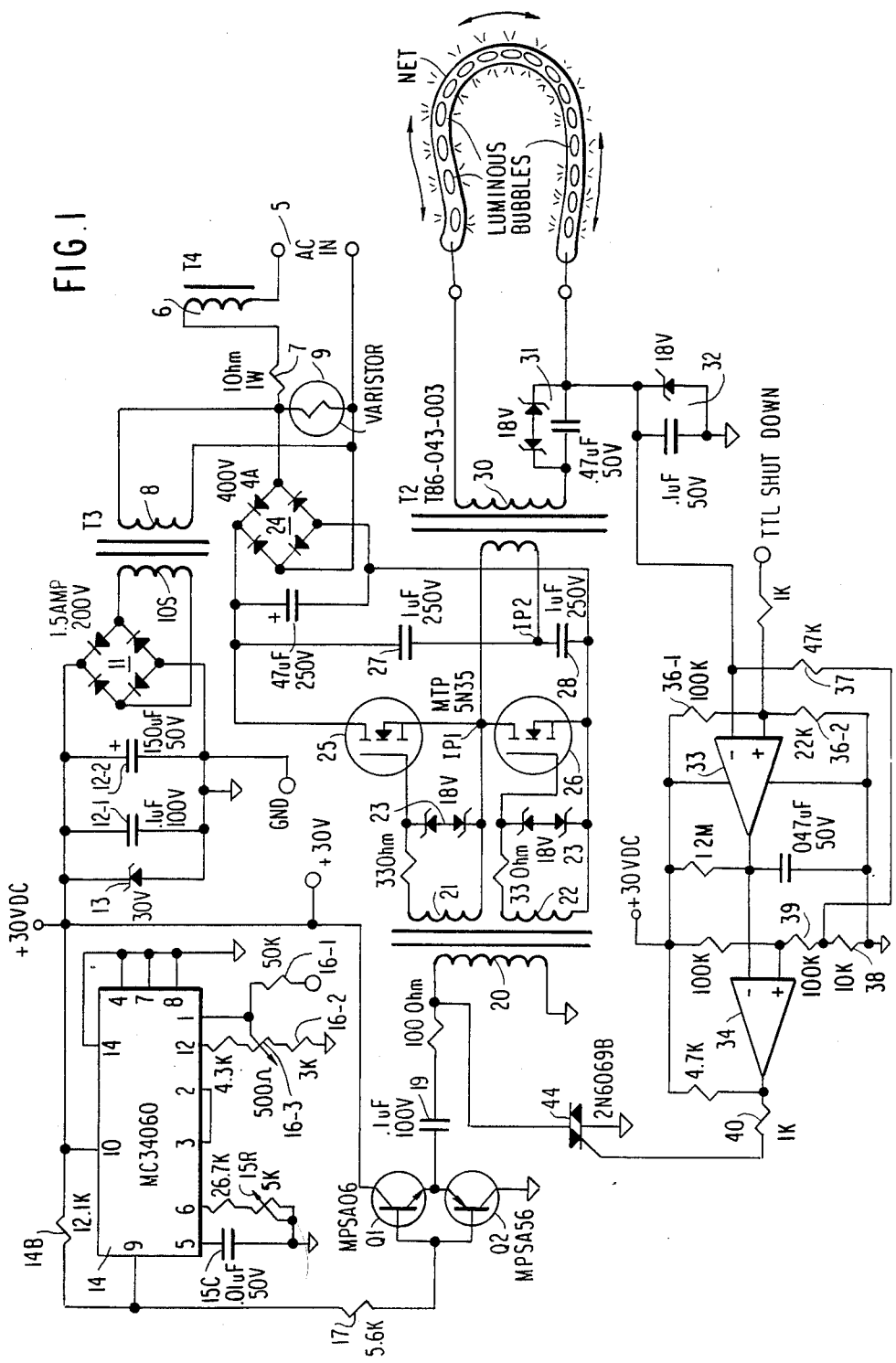
FIG. 1 is a circuit diagram incorporating the invention.

Referring now to the circuit diagram shown in FIG. 1, an AC supply 5 supplies alternating current through a choke filter 6 and fuse resistor 7 to the primary winding 8 of transformer T3. A varister 9 stabilizes the input voltage. Transformer T3 is a step down transformer and applies a low AC voltage to a bridge rectifier 11 which has a pair of filter capacitors 12-1, 12-2 on the output thereof, and a zener diode 13 for stabilizing the output voltage, preferrably at about 30 volts DC. A switch mode pulse width modulation control circuit 14 (a Motorola MC34060 or MC35060) has an oscillator therein (not shown) connected to an external pulse width modulation control circuit constituted by resistors 16-1, 16-2 and potentiometer 16-3 and an external frequency control circuit constituted by capacitor 15C and potentiometer resistor 15R which permits the potentiometer to adjust the resistance leg and thereby adjust the frequency of the internal oscillator in chip 14. The output on terminal 9 has an internal transistor supplying output to the intermediate point between bias control resistor 14-B and coupling resistor 17.

The lower end of coupling resistor 17 is connected to the base inputs of a pair of tandem connected complementary emitter follower NPN-NPN transistors Q1 and Q2 which provides a low impedance drive circuit to the input of winding 20 of signal transformer T1 via a coupling capacitor 19C and resistor 19-R. Transformer T1 has a pair of secondary windings 21 and 22 which have a back-to-back zener diodes 23 connected thereacross and with the signals therefrom being used to drive the gate electrodes of FET transistors 25 and 26 respectively. A further bridge rectifier 24 rectifiers the AC line voltage from source 5 and has a filter capacitor 24-C connected thereacross for filtering purposes. (In this regard, the separate supply constituted by transformer T3 and bridge rectifier 11 can, if desired, be eliminated and a voltage divider used to supply the lower DC voltage to supply the pulse width modulator chip 14 with 30 volts).

The FET transistors 25 and 26 have their drain-source electrodes connected in series or tandem relation across the high voltage supply (about 170 volts) and, a pair of capacitors 27, 28 are likewise connected in tandem across the high voltage supply. The intermediate point IP1 between the tandem connected FET transistors 26 and 27 is connected to one end of the primary winding 29 of high voltage output transformer T4 and the intermediate point IP2 between capacitors 27 and 28 is connected to the opposite end of primary winding 29 of transformer T2. Thus, when the input signal current flowing through transformer winding 20 is in one direction, one of transistors 25 will be gated on to cause a current to flow through winding 29 in one direction and when the direction of current flow through transformer winding 20 is in the opposite direction, a further signal is generated in the secondary winding of one of transformer windings 21 and 22 to trigger the other FET transistor (and the opposite FET transistor is baised off by opposite polarity signals in the other secondary winding of transformer T1) on and thereby cause an opposite direction of current flow through transformer winding 29. Thus, by modulating the width of the pulses and/or the frequency of the pulses from pulse width modulation control circuit 14, one is able to control both the direction and speed of the luminous bubbles flowing in the neon tube NET.

A coupling capacitor 31 in the lower lead from secondary winding 30 has a pair of back-to-back diodes connected thereacross and adjacent the neon tube NET is coupled through a zener diode capacitor circuit 32 to the input of a ground-fault sensing circuit which includes a pair of comparison resistors 36-1, 36-2 which receive, via a further fixed resistor, a selected reference voltage. The voltage on the output of winding 30 is sensed across resistor 37 and comparator 33 compares this against the reference voltage to detect a change in that voltage. Upon detecting a change in that voltage, a signal is applied through the resistor capacitor output thereof to a further comparator circuit 34 which likewise receives via resistor 37 at the intermediate point between resistors 30 and 39 the signal voltage which forms a second comparison. Thus, a person touching one of the electrodes on the tube NET causes a change in the voltage such that that change is detected in the ground-fault detection circuitry to produce an output signal via resistor 40 and onto the gate electrode of switching thyristor pair 41. This provides a shunt bypass to signal input on the primary winding 20 of transformer T1 thereby avoiding or preventing the application of control signals to the gate electrodes of the FET's 25 and 26 and thereby preventing the further generation of a high voltage until the ground-fault is removed.

Figure 2:
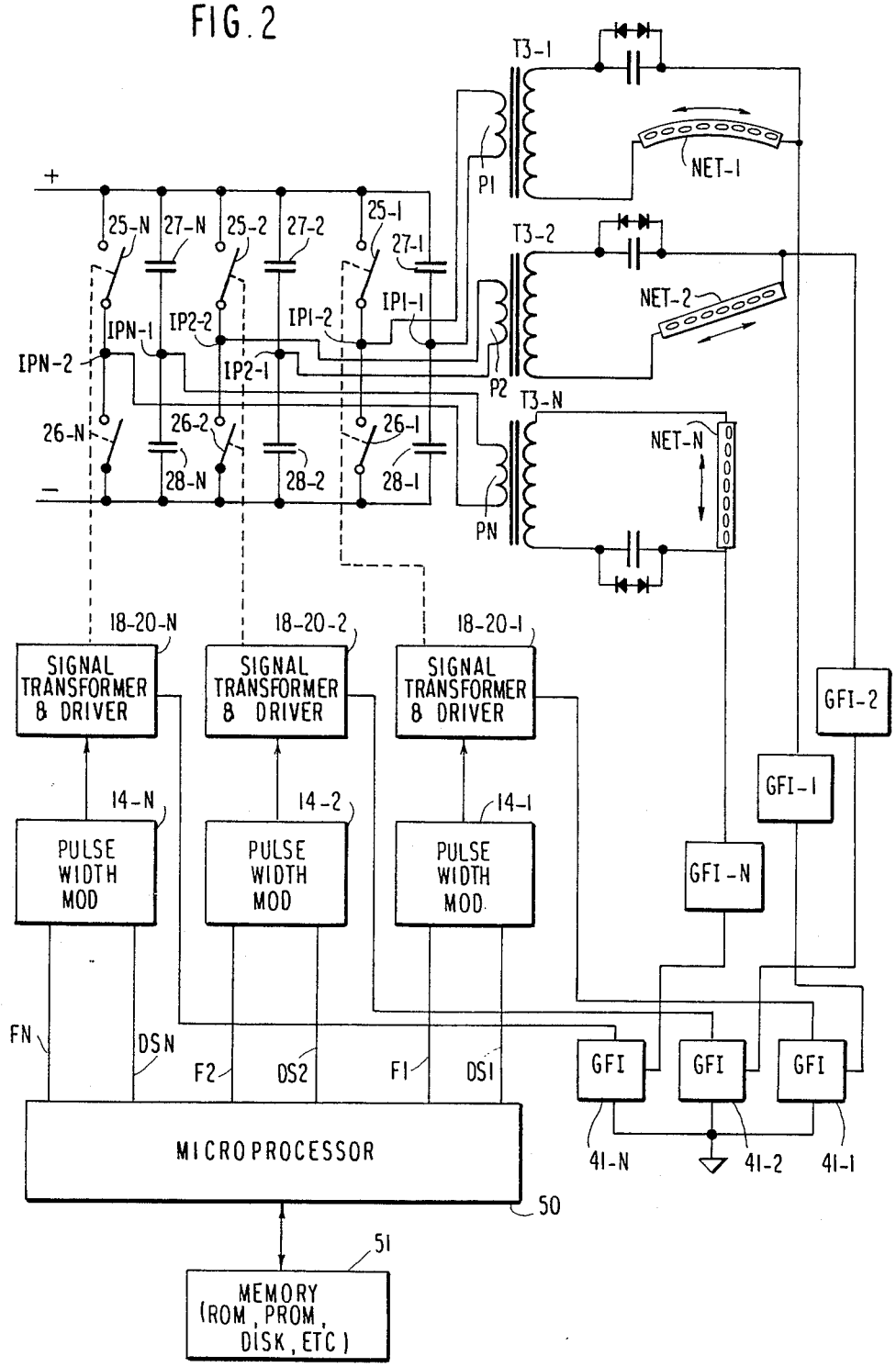
FIG. 2 is a modification of the circuit diagram shown in FIG. 1 illustrating the embodiment of the invention wherein a plurality of separate neon tubes are separately drive and controlled via a stored memory and a microprocessor coupled to same and to the separate driving circuits.

Referring now to FIG. 2, a plurality of neon tubes NET-1, NET-2 . . . NET-N, supplied by a high voltage transformers T3-1, T3-2 . . . T3-N, each of which are separately driven from a pair of tandem connected switches 25-1, 25-2 . . . 25-N, 26-1, 26-2 . . . 26-N and paralleled by a pair of tandem connected capacitors 27-1, 27-2 . . . 27-N, 28-1, 28-2 . . . 28-N with the intermediate points IP1-1, IP1-2, IP2-1, IP2-2 . . . IPN-1, IPN-2 between the tandem connected switches and the tandem connected capacitors being connected to the ends of the primary windings P-1, P-2 . . . P-N of the high voltage output transformers T3-1, T3-2 . . . T3-N. Each of the switches is an electronic switch corresponding to the FET switches 25 and 26 shown in FIG. 1. The drive circuitry 18-20-1, 18-20-2 . . . 18-20-N for the switches is schematically shown as operating and opening and closing of the switches 25, 26, it being understood that these are representations of the electronic FET switches 25 and 26 shown in FIG. 1 and the transformer circuitry related thereto. Each of the switches is driven from a pulse width modulator circuit 14-1, 14-2, 14-N each of which in turn receives duty cycles (pulse width) and frequency adjust input signals DS and E from a microprocessor 50 which, in turn, receives a sequence of control signals representing a pattern corresponding to a predetermined direction, speed (including stationary) of movement of the different luminous bubbles in each of the tubes NET-1, NET-2, NET-N, respectively. The speed can, of course, be so fast that the luminous bubbles are no longer discernable and a conventional neon light display results. Thus, the programable read-only memory 51 is accessed by the microprocessor 50 which, in turn, supplies the different patterns (luminous bubble flow direction, speed, etc.) to the pulse width modualtor circuits 14-1, 14-2 . . . 14-N to thereby simultaneously control the direction of movement rate of movement and/or stationary positions of the luminous bubbles in each of the individual tubes.

The individual tubes NET-1, NET-2, NET-N can be either stacked-up in vertical order for viewing simultaneously, or serially in any sequence desired so that many combined luminous effect can be achieved through the combination of the tube either in serial, parallel or stacked vertical order for viewing purposes.

While there has been shown and described a preferred embodiment of the invention, it will be appreciated that numerous other embodiments will be readily apparent to those skilled in the art and it is intended that the accompanying claims embody within their scope those obvious modifications that would be readily apparent to one skilled in the art.

What is claimed is:

1. In a system for driving a neon tube to form luminous bubbles and controlling the motion thereof in which a modulatable high AC voltage source is connected to electrodes of said neon tube, the improvement comprising, said modulatable high AC voltage source including a pair of electronic switches for controlling the generation of a high voltage at said source for driving said neon tube, memory means for storing predetermined control sequences for said pair of electronic switches to modulate the high voltage from said modulatable high voltage source and vary the movement patterns of the direction and speed of said luminous bubbles in said neon tube and means for retrieving from said memory a signal constituting a retrieved predetermined pattern of direction and speed of said luminous bubbles and controlling said pair of electronic switches to modulate said modulatable AC voltage in accordance with said retrieved predetermined pattern from said memory means and operating said pair of electronic switches in such a way as to cause said luminous bubbles to move in said retrieved predetermined patterns of direction and speed.

2. A system for driving a neon tube to form luminous bubbles and controlling the motion thereof as described in claim 1 wherein said memory means includes a plurality of predetermined patterns stored in said memory means, and microprocessor means for selecting one of said predetermined patterns of the direction and speed of movement of said luminous bubbles and driving said neon tube in accordance therewith.

3. The system as defined in claim 1 wherein there are a plurality of said neon tubes arrayed in a pattern and a plurality of said modulatable high AC voltage AC sources connected to respective ones of said neon tubes, said memory means is adapted to store a plurality of control sequences each control sequence representing a pattern corresponding to a predetermined direction and bubbles, and microprocessor means for selecting one or more of said predetermined patterns for driving one or more of said neon tubes to produce patterns of luminous bubble movements in respective ones of said plurality of neon tubes.

4. The a system for driving gas filled tube to form luminous bubbles in the tube and controlling the speed and direction of motion thereof, a modulatable signal source and a transformer means having primary and secondary windings, means connecting said primary windings to said modulatable signal source and means connecting said secondary windings to said gas filled tube so as to form luminous bubbles in said tube, the improvement comprising:

electronic switch means connected to said primary winding for switching current flow therethrough, and means connecting said switch means to said modulatable signal source to control the switching of current through said primary winding and the voltage induced in said secondary windings and applied to said gas filled tube, memory means for storing one or more predetermined control sequence signals for said electronic switch means, and means connecting said memory means to said modulatable signal source to modulate same by a predetermined control sequence signal and thereby modulate the motion of said luminous bubbles according to the control sequence signal stored in said memory means.

5. the system defined in claim 4 wherein said memory means is an electronic memory and there are a plurality of different control sequence signals stored therein, and said means connecting said memory means to said modulatable signal source includes a microprocessor programmed to receive one or more of said control sequence signals from said memory means and apply same to said modulatable signal source.

6. The system defined in claim 4 wherein said modulatable signal source has means to pulse width modulate signals applied to said electronic switch means.

7. The system defined in claim 4 wherein said modulatable signal source has means to frequency modulate signals applied to said electronic switch means.

8. The system defined in claim 4 wherein there are a plurality of said filled tubes, and a separate transformer means, modulatable signal source and electronic switch means connected to each gas filled tube, respectively, said microprocessor being connected to each of said signal sources and being programmable to retrieve from said memory means any selected motion sequence for luminous bubbles for driving each modulatable signal source, respectively.

* * * * *